July 7, 1953
A. A. VARELA
2,644,926
ELECTRONIC SWITCH FOR HIGH-FREQUENCY POWER
Filed Jan. 9, 1948
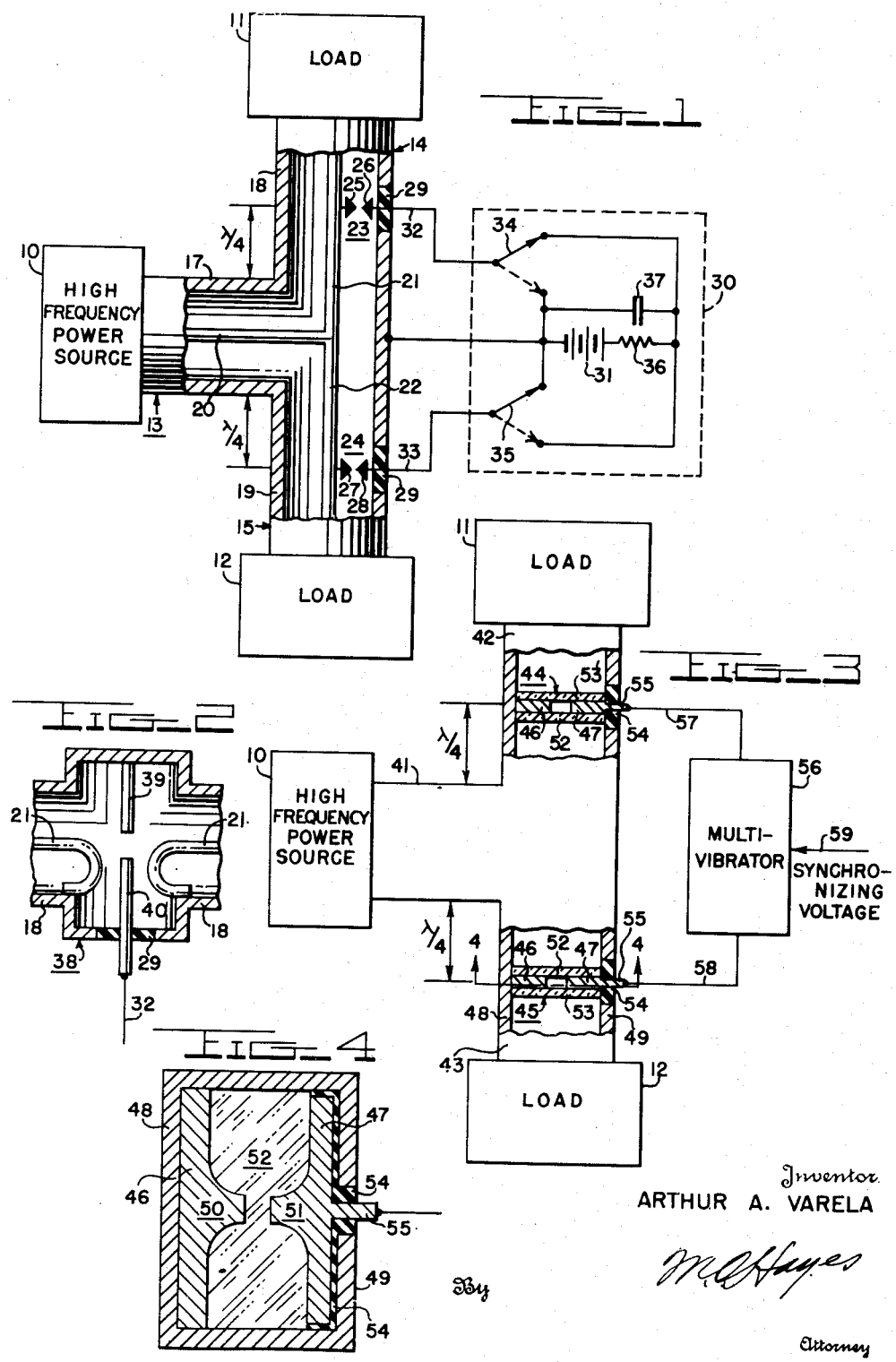
Inventor.
ARTHUR A. VARELA Patented July 7, 1953

2,644,926

UNITED STATES PATENT OFFICE 2,644,926

ELECTRONIC SWITCH FOR HIGH-FREQUENCY POWER

Arthur A. Varela, Alexandria, Va.

Application January 9, 1948, Serial No. 1,424

4 Claims. (Cl. 333—7)

(Granted under Title 35, U. S. Code (1952), sec. 266)

This invention relates to switching devices and more particularly to a device for selectively or alternately switching high frequency power from one mechanical transmission medium to other mechanical transmission mediums.

In a copending application, Serial No. 1,423, filed January 9, 1948, for Means for Controlling the Transmission of Electromagnetic Energy Through Mechanical Transmission Mediums, a system is disclosed for controlling the propagation characteristics of a mechanical transmission medium in accordance with a predetermined controlling influence, with the propagation characteristics being variable from a condition effecting substantially complete attenuation of electromagnetic energy to a condition wherein electromagnetic energy is only attenuated by inherent characteristics of the transmission medium. In particular, a multi-electrode voltage discharge device is included in a mechanical transmission medium, so designed and calibrated to produce, in response to energizing electromagnetic energy, a voltage discharge having an impedance value sufficient to establish an effective short circuit in the mechanical transmission medium. A direct current supply is provided to apply variable direct current bias to one of the electrodes of the voltage discharge device to increase the impedance value of the voltage discharge in accordance therewith. By applying a sufficient direct current bias the voltage discharge device is rendered non-responsive to energizing electromagnetic energy and maximum energy transfer results. It is contemplated by the present invention to apply the foregoing principles in connection with a switching device for high power electromagnet energy.

It is therefore an object of the present invention to provide a novel switching device for high frequency power.

Another object is to provide a novel switching device for controlling the transfer of high frequency electromagnetic energy through a mechanical transmission medium wherein the propagation characteristics of the transmission medium may be selectively varied to effect substantially complete attenuation of the energy or to allow transmission of energy only attenuated by inherent characteristics of the mechanical transmission medium.

Another object of the present invention is to provide a novel switching device for selectively switching high frequency electromagnetic energy from one mechanical transmission medium to one of a plurality of other mechanical transmission mediums.

Another object is to provide a novel device for selectively switching high frequency power from one mechanical transmission medium alternately to a pair of other mechanical transmission medium in accordance with a predetermined controlling influence.

Still another object of the present invention is to provide a novel device for switching high frequency electromagnetic energy from a mechanical transmission medium to any one of a plurality of other mechanical transmission mediums wherein the mechanical transmission mediums are mechanically coupled to provide maximum transfer of energy and wherein the switching function is accomplished by establishing effective short circuits in the plurality of mechanical transmission mediums in response to energizing power and by selectively eliminating the effect of such short circuit through application of controlling influence derived from an electronic device.

Other objects and features of the present invention will appear more fully hereinafter from consideration of the following detailed description in connection with the accompanying drawing which discloses several embodiments of the invention. It is to be expressly understood however that the drawing is designed for purposes of illustration only and not as a definition of the limits of the invention, reference for the latter purpose being had to the appended claims.

In the drawing, wherein similar reference characters denote similar elements throughout the several views:

Fig. 1 is a diagrammatic illustration, partly in section, of a high frequency power switching device constructed in accordance with the principles of the present invention;

Fig. 2 is an illustration of an alternate construction that may be employed in connection with the device disclosed in Fig. 1;

Fig. 3 is a diagrammatic illustration, partly in section, of a switching device for high frequency power constructed in accordance with the principles of another embodiment of the present invention, and Fig. 4 is a sectional illustration through line 4—4 of Fig. 3.

With reference more particularly to Fig. 1 of the drawing, a switching device constructed in accordance with the principles of the present invention is disclosed therein for selectively feeding high frequency power from source 10 to load 11 or to load 12. The switching device includes a main mechanical transmission medium 13 energized from the source 10 and branch mechanical transmission mediums 14 and 15 forming transmission paths between the main mechanical transmission medium 13 and the loads 11 and 12, respectively. Although the main and branch mechanical transmission mediums 13, 14 and 15 are disclosed in the form of concentric transmission lines including outer conductors 17, 18 and 19 and central conductors 20, 21 and 22, respectively, it is to be expressly understood that other forms of mechanical transmission mediums may be employed in connection with the present invention, for example, parallel transmission lines or wave guides of the hollow pipe type. As shown in the drawing, the main mechanical transmission medium 13 and the branch mechanical transmission mediums 14 and 15 are mechanically joined together to form a T junction, with connection between the central and outer conductors thereof comprising continuous surfaces to provide maximum transfer of high frequency power from the main mechanical transmission medium 13 to the branch mechanical transmission mediums 14 and 15.

The switching device further includes voltage discharge devices 23 and 24 respectively positioned at predetermined points in the branch mechanical transmission mediums 14 and 15 with respect to the T junction. The voltage discharge devices 23 and 24 are of the multi-electrode type including electrodes 25—26 and electrodes 27—28, respectively. The electrodes 25 and 27 are secured to the central conductors 21 and 22, while the electrodes 26 and 28 are supported by the outer conductors 18 and 19, respectively, by means of suitable insulating material 29—29, the purpose of which will appear more fully hereinafter. The voltage discharge devices 23 and 24 are designed and calibrated to produce, in response to high frequency power from the source 10, a voltage discharge across the electrodes thereof offering an impedance to the energizing high frequency power sufficiently low, with respect to the characteristic impedance of the branch transmission mediums 14 and 15, to establish a substantial short circuit across the branch mechanical transmission mediums 14 and 15. The voltage discharge devices 23 and 24 are positioned a predetermined distance from the T junction equal to an odd multiple, including one, of an electrical quarter wave length of the frequency of the source 10. This arrangement provides impedance inversion and establishes substantially open circuits at the T junction whenever a substantial short circuit is produced at the voltage discharge devices 23 or 24. With the foregoing arrangement, the voltage discharge devices 23 and 24 are responsive to the energizing high frequency power to effectively disconnect the branch mechanical transmission mediums 14 and 15 from the main mechanical transmission medium 13 and thus prevent transfer of power to the loads 11 and 12.

As mentioned heretofore, it is an object of the present invention to provide means for controlling the voltage discharge devices 23 and 24 in such a manner as to allow transmission of high frequency power from the source 10 to either of the loads 11 or 12 only attenuated by inherent characteristics of the transmission mediums 13, 14 and 15. The foregoing means comprises a control device 30 designed to control either of the voltage discharge devices 23 and 24 to accomplish the foregoing results in accordance with a manual operation. The control device 30 includes a source of direct current potential 31 having a negative terminal connected to the outer conductors 18 and 19 and with a positive terminal thereof connectible to the electrode 26, through a conductor 32, or to the electrode 28, through a conductor 33, in accordance with operation of ganged switches 34 and 35. In the illustrated position of the switches 34 and 35, a predetermined potential differential is established between the electrode 26 and the outer conductor 18 of the mechanical transmission medium 14, while the electrode 28 of the voltage discharge device 24 is maintained at the potential of the outer conductor 19 of the branch mechanical transmission medium 15. The source 31 is selected to apply sufficient direct current bias to the electrode 26 to prevent formation of a voltage discharge at the device 23 in response to high frequency power from the source 10. An explanation of the theory of operation of why the voltage discharge impedance is increased when the direct current bias is applied to electrode 26 is found in the January 15, 1947, issue of the magazine, The Physical Review, pages 124–125, in an article titled "Effect of direct-current potential on initiation of radiofrequency discharge," by A. A. Varela. A direct current bias substantially equal to the root mean square voltage of the high frequency power from the source 10 has been found to be satisfactory. With the voltage discharge device 23 rendered non-responsive to the energizing high frequency power upon operation of the control device 30, the power from the source 10 is transferred through the medium 14 to the load 11, while the load 12 is effectively disconnected from the source 10 due to the voltage discharge produced at the device 24. When the switches 34 and 35 are moved to the position shown by broken lines in the drawing the direct current bias is applied through the conductor 33 to the electrode 28 to prevent formation of a voltage discharge at the voltage discharge device 24 thereby allowing transmission of high frequency power to the load 12 without substantial attenuation, while rendering the voltage discharge device 23 responsive to the energizing high frequency power to effectively disconnect the branch medium 14 from the source 10.

The control device 30 includes series resistance 36 and parallel capacitance 37 for further controlling the voltage discharge devices 23 and 24. Under some circumstances, the application of abnormally high power surges from the source 10 for example, the voltage discharge devices, although biased non-responsive to the energizing power, may be effected to produce a voltage discharge. Under such circumstances discharge of the capacitance 37 would effectively quench the abnormal voltage discharge and the normal operation of the switching device would only be temporarily interrupted.

In accordance with the principles of the present invention the voltage discharge devices 23 and 24 may be coupled to the branch mechanical transmission mediums through impedance transformer means. A resonant cavity type impedance transformer device 38 is shown in Fig. 2 associated with the mechanical transmission medium 14 in a conventional manner. It is to be understood that a similar type of impedance transformer means may be included in the branch mechanical transmission medium 15. In this embodiment the voltage discharge device includes electrodes 39 and 40 positioned in the cavity 38 to produce a voltage discharge in response to resonant voltages generated therein. The electrode 40 is insulated from the cavity 38 by the insulating material 29 and is connected to the control device 30 through the conductor 32. By employing impedance transformer means, such as the type described heretofore, a substantial open circuit is more readily established between the branched mechanical transmission lines 14 and 15 and the T junction with the main mechanical transmission line 13 in response to energizing power, thus providing more complete switching and more accurate control thereof.

Another embodiment of the present invention is disclosed in Fig. 3 of the drawing. In this embodiment the novel switching device is disclosed in connection with mechanical transmission mediums of the wave guide type having rectangular cross section, and with electronic control means for effecting transfer of high frequency power from the source 10 alternately to the loads 11 and 12 in accordance wtih a predetermined controlling influence. As shown, main wave guide 41, energized with high frequency power from the source 10, is terminated in a T junction including branch wave guides 42 and 43, the latter respectively functioning to transfer the high frequency power to the loads 11 and 12. The T junction connecting the wave guides 41, 42 and 43 is disclosed in the form of an H type, or magnetic plane T junction, however, it is to be expressly understood that the present invention is applicable in connection with E type, or electric plane wave guide T junctions. Voltage discharge devices 44 and 45 are positioned in the branch wave guides 42 and 43, respectively, a predetermined distance from the T junction equal to an odd multiple, including one, of electrical quarter wave lengths of the frequency of the source 10. The voltage discharge devices 44 and 45 are constructed in a like manner, with similar elements designated by corresponding reference numerals. As shown, with additional reference to Fig. 4, the voltage discharge device 45 includes metallic tabs 46 and 47 positioned adjacent the large dimension walls 48 and 49 respectively of the wave guide 43 to form a resonant coupling iris. Intermediate portions 50 and 51 of the metallic tabs 46 and 47, respectively, are extended inwardly toward the center of the wave guide 43 to form voltage discharge electrodes. Dielectric windows 52 and 53 are sealed on opposiite sides of the tabs 46 and 47, throughout the cross sectional area of the wave guide, to define an envelope including the discharge path between the portions 50 and 51. The envelope thus formed may be filled with suitable gas such as hydrogen, under low predetermined pressures, to form a voltage discharge device sensitive to predetermined igniting voltages. The metallic tab 47 is insulated from the wave guide by suitable insulating material 54 and includes an extension 55 terminating outside the wall 49. The voltage discharge devices 44 and 45 are designed and calibrated to produce a voltage discharge across the portions 50 and 51 whenever resonant voltages appear across the resonant iris in response to energization of the wave guide 41 with high frequency power from the source 10.

As previously mentioned, this embodiment includes electronic control means for alternately effecting transmission of high frequency power from the source 10 to the load 11 or to the load 12 in accordance with a predetermined controlling impedance. As shown, the foregoing means includes a conventional multivibrator circuit 56 including a two stage resistance-capacitance coupled amplifier, having the output of one stage feeding the voltage discharge device 44 through conductor 57, and the output of the other stage thereof feeding the voltage discharge device 45 by way of conductor 58. The multivibrator 56 may be free running to alternately apply direct current biases to the voltage discharge devices 44 and 45 at a predetermined rate determined by the natural frequency thereof, or the multivibrator 56 may be driven in a conditional manner by a synchronizing voltage applied thereto through conductor 59. The multivibrator 56 is adjusted to apply sufficient direct current bias to the voltage discharge devices 44 and 45 to prevent formation of the voltage discharge therein in response to high frequency power energization. In particular, the direct current bias is applied to the insulated metallic tabs 47, 47 of the voltage discharge devices 44 and 45 to effect a potential differential across the resonant irises irrespective of resonant voltages. The established potential differential is sufficient to prevent voltage discharge formation.

When the main wave guide 41 is energized with high frequency power from the source 10, and the multivibrator 56 is inoperative, voltage discharges appear across the branch wave guides 42 and 43 at the voltage discharge devices 44 and 45 to effectively short circuit the branch wave guides. Since the main and branch wave guides are connected in an H type T junction, and since the voltage discharge devices 44 and 45 are positioned an odd multiple of electrical quarter wave lengths of the power frequency from the T junction, the short circuits in the branch wave guides are reflected as open circuits at the T junction. Under the foregoing conditions therefore no power is transmitted to the loads 11 and 12. When the multivibrator 56 operates to alternately apply direct current bias to the voltage discharge devices 44 and 45, the discharge devices are alternately rendered non-responsive to the energizing power. Consequently, high frequency power is alternately fed to the loads 11 and 12 in accordance with operation of the multivibrator circuit 56. When an E type T junction is employed the voltage discharge devices 44 and 45 are positioned an even multiple of electrical quarter wave lengths of the power frequency from the T junction. With this arrangement, the short circuit produced across the branch wave guides 42 and 43 prevents transfer of power to the loads 11 and 12, and when one of the discharge devices is rendered non-responsive to the energizing high frequency power the reflected short circuit to the T junction from the responsive voltage discharge device completes the transmission path from the main wave guide 41 through the open branch wave guide.

Although the embodiments disclosed in Figs. 1 and 2 provide selective or alternate switching between two loads it is to be expressly understood that additional branch transmission mediums may be coupled to the main mechanical transmission medium. Furthermore, the electronic control means disclosed in Fig. 3 may be utilized in connection with the Fig. 1 embodiment and the manually operable control device 30 may be employed with the Fig. 3 embodiment.

There is thus provided by the present invention a novel device for switching a mechanical transmission medium carrying high frequency power and a device for switching high frequency power selectively or alternately from one mechanical transmission medium to other mechanical transmission mediums. The arrangement are such that the mechanical transmission mediums are positively coupled together to provide maximum power transfer and the switching function is produced by effecting the propagation characteristics of the mechanical transmission medium through electrical or electronic means. Furthermore, the devices disclosed herein may be readily employed in connection with all conventional types of mechanical transmission mediums, for example, parallel transmission lines, concentric transmission lines and wave guides of the hollow pipe type. Moreover, the switching devices may be controlled upon manual operation of an electrical control device for selective transfer of high frequency power, or by electronic control means capable of providing alternate transmission of high frequency power at a high rate in accordance with a predetermined controlling influence.

Although several embodiments of the present invention have been disclosed and described herein it is to be expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. A switching device comprising a plurality of transmission lines having a common junction, a source of electromagnetic energy feeding one of said lines, a separate voltage discharge device positioned in each of the remaining transmission lines, each of said discharge devices having a pair of electrodes across which a voltage discharge can occur in the presence of said electromagnetic energy, a direct current source having two terminals of opposite polarity, one side of each of said transmission lines being connected to one terminal of said direct current source, switching means, one electrode of each of said discharge devices being connected to the other side of its respective transmission line, the other electrode of selected discharge devices being connected to the other terminal of said direct current source through said switching means, whereby said electromagnetic energy will be transmitted through the lines containing said selected discharge devices.

2. A switching device comprising a plurality of transmission lines having a common junction, a source of electromagnetic energy feeding one of said lines, a separate voltage discharge device positioned in each of the remaining transmission lines, each of said discharge devices having a pair of electrodes across which a voltage discharge can occur in the presence of said electromagnetic energy, a direct current source having two terminals of opposite polarity, each discharge device having its electrodes effectively connected across its respective transmission line, switching means, one electrode of selected discharge devices being connected to one terminal of said direct current source through said switching means, the other terminal of said direct current source being connected to one side of each of said transmission lines, whereby said electromagnetic energy will be transmitted through the lines containing said selected discharge devices.

3. A switching device comprising a plurality of transmission lines having a common junction, a source of electromagnetic energy feeding one of said lines, a separate voltage discharge device positioned in each of the remaining transmission lines, each of said discharge devices having a pair of electrodes across which a voltage discharge can occur in the presence of said electromagnetic energy, a direct current source having two terminals of opposite polarity, one side of each of said transmission lines being connected to one terminal of said direct current source, switching means, one electrode of each of said discharge devices being connected to the other side of its respective transmission line, the other electrode of selected discharge devices being connected to the other terminal of said direct current source through said switching means, the other electrode of the remaining discharge devices being connected to said one side of its respective transmission line through said switching means, whereby said electromagnetic energy will be transmitted through said lines containing said selected discharge devices.

4. A switching device comprising a plurality of transmission lines having a common junction, a source of electromagnetic energy feeding one of said lines, a separate voltage discharge device positioned in each of the remaining transmission lines, each of said discharge devices having a pair of electrodes across which a voltage discharge can occur in the presence of said electromagnetic energy, a direct current source producing a potential substantially equal to the root mean square of the electromagnetic energy, said direct current source having two opposite polarity output terminals, one side of each of said transmission lines being connected to one terminal of said direct current source, switching means, one electrode of each of said discharge devices being connected to the other side of its respective transmission line, the other electrode of selected discharge devices being connected to the other terminal of said direct current source through said switching means, the other electrode of the remaining discharge devices being connected to said one side of its respective transmission line through said switching means, whereby said electromagnetic energy will be transmitted through said lines containing said selected discharge devices.

ARTHUR A. VARELA.

References Cited in the file of this patent

UNITED STATES PATENTS

| Number | Name | Date |
|---|---|---|
| 2,106,770 | Southworth | Feb. 1, 1938 |
| 2,403,303 | Richmond | July 2, 1946 |
| 2,404,832 | Espley | July 30, 1946 |
| 2,408,055 | Fiske | Sept. 24, 1946 |
| 2,408,425 | Jenks | Oct. 1, 1946 |
| 2,412,315 | Brown | Dec. 10, 1946 |
| 2,412,751 | Rochester | Dec. 17, 1946 |
| 2,416,168 | Fiske | Feb. 18, 1947 |
| 2,439,651 | Dome | Apr. 13, 1948 |
| 2,544,842 | Lawson | Mar. 13, 1951 |